(12) United States Patent
Hong et al.

(10) Patent No.: US 8,614,771 B2
(45) Date of Patent: Dec. 24, 2013

(54) LENTICULAR LENS ARRAY AND IMAGE DISPLAY DEVICE INCLUDING THE SAME

(75) Inventors: Hyung-Ki Hong, Seoul (KR);
Byung-Joo Lee, Gyeonggi (KR);
Sung-Min Jung, Incheon (KR); Ju-Un Park, Gyeonggi (KR); Hyun-Ho Shin, Gyeonggi (KR)

(73) Assignee: LG Display Co., Ltd., Seoul (KR)

( * ) Notice: Subject to any disclaimer, the term of this patent is extended or adjusted under 35 U.S.C. 154(b) by 408 days.

(21) Appl. No.: 11/606,902

(22) Filed: Dec. 1, 2006

(65) Prior Publication Data

US 2007/0296896 A1 Dec. 27, 2007

(30) Foreign Application Priority Data

Jun. 27, 2006 (KR) .................. 10-2006-0058232

(51) Int. Cl.
 G02F 1/1335 (2006.01)
 G02F 1/1343 (2006.01)
 G02F 1/13 (2006.01)
 H04N 9/47 (2006.01)

(52) U.S. Cl.
 USPC ............... 349/15; 349/141; 349/200; 348/59

(58) Field of Classification Search
 USPC .................... 349/95, 141, 200; 348/59
 See application file for complete search history.

(56) References Cited

U.S. PATENT DOCUMENTS

| | | | |
|---|---|---|---|
| 5,056,912 A * | 10/1991 | Hamada et al. | 353/38 |
| 6,714,174 B2 * | 3/2004 | Suyama et al. | 345/32 |
| 6,812,987 B2 * | 11/2004 | Lee | 349/141 |
| 7,058,252 B2 * | 6/2006 | Woodgate et al. | 385/16 |
| 7,215,475 B2 * | 5/2007 | Woodgate et al. | 359/624 |
| 7,339,638 B2 * | 3/2008 | Kitamura | 349/95 |
| 7,359,013 B2 * | 4/2008 | Sung et al. | 349/69 |
| 7,471,352 B2 * | 12/2008 | Woodgate et al. | 349/57 |
| 7,532,272 B2 * | 5/2009 | Woodgate et al. | 349/95 |
| 7,750,981 B2 * | 7/2010 | Shestak et al. | 349/15 |
| 7,986,374 B2 * | 7/2011 | Ijzerman et al. | 349/15 |
| 8,059,216 B2 * | 11/2011 | Hiddink et al. | 349/15 |
| 2006/0098296 A1 | 5/2006 | Woodgate et al. | |
| 2006/0268196 A1 * | 11/2006 | Jung | 349/95 |
| 2007/0035672 A1 * | 2/2007 | Shestak et al. | 349/15 |
| 2007/0296896 A1 * | 12/2007 | Hong et al. | 349/122 |
| 2008/0013002 A1 * | 1/2008 | Hong et al. | 349/15 |
| 2008/0084518 A1 * | 4/2008 | Brott et al. | 349/65 |
| 2008/0204872 A1 * | 8/2008 | Ijzerman et al. | 359/463 |
| 2008/0252639 A1 * | 10/2008 | Ijzerman et al. | 345/419 |

(Continued)

OTHER PUBLICATIONS

W.L. IJzerman, et al, 7.4: Design of 2D/3D Switchable Displays, SID 05 Digest, pp. 98-101.

(Continued)

*Primary Examiner* — Uyen Chau N Le
*Assistant Examiner* — John M Bedtelyon
(74) *Attorney, Agent, or Firm* — Morgan, Lewis & Bockius LLP (57) ABSTRACT

An image display device includes a display panel, a first substrate over the display panel, a plurality of first electrodes on the first substrate, a plurality of second electrodes alternately arranged with the plurality of first electrodes, a second substrate facing the first substrate, a replica layer on the second substrate and having a concave pattern of half-cylinder shape, the concave pattern facing the second electrode, and a liquid crystal layer in the concave pattern.

20 Claims, 5 Drawing Sheets

(56) References Cited

U.S. PATENT DOCUMENTS

| | | | |
|---|---|---|---|
| 2008/0259233 A1* | 10/2008 | Krijn et al. | 349/15 |
| 2008/0266472 A1* | 10/2008 | Hiddink et al. | 349/15 |
| 2008/0297594 A1* | 12/2008 | Hiddink et al. | 348/59 |
| 2008/0316380 A1* | 12/2008 | Ijzerman et al. | 349/15 |
| 2009/0033812 A1* | 2/2009 | Ijzerman et al. | 349/15 |
| 2010/0195190 A1* | 8/2010 | Ishioka et al. | 359/316 |

OTHER PUBLICATIONS

Korean Office Action, dated Jul. 13, 2012.

* cited by examiner

LENTICULAR LENS ARRAY AND IMAGE DISPLAY DEVICE INCLUDING THE SAME

The present application claims the benefit of Korean Patent Application No. 2006-0058232 filed in Korea on Jun. 27, 2006, which is hereby incorporated by reference.

BACKGROUND OF THE INVENTION

1. Field of the Invention

The present invention relates to a lenticular lens array and an image display device including the same, and more particularly, to a lenticular lens array type dimension-switchable image display device that is able to switch from a two dimensional mode into a three dimensional mode or from the three dimensional mode into the two dimensional mode.

2. Discussion of the Related Art

A technology of producing three dimensional (3-D) images including 3-D stereoscopic images from two dimensional (2-D) images can be used in display technologies, aerospace technologies, etc. The technology using ripple effects to produce 3-D images can not only be used in applications for high definition televisions (HDTV), but also can be used in a variety of other applications.

The technology of producing 3-D stereoscopic images includes a volumetric type, a holographic type, and stereoscopic type. The volumetric type uses psychological illusions to create illusory perception along a depth direction. When observers receive 3-D computer graphical images on a large screen having a wide view angle, the observers can experience viewing an optical illusion. By calculating and implementing various factors in 3-D computer graphics technology, images can be displayed to give the observers a 3-D effect on movement, brightness, shade, etc. An example of this kind of volumetric type of display is an IMAX™ movie. In an IMAX™ movie, two camera lenses are used to represent images for the left and right eyes. The two lenses are separated by an average distance between a human's eyes. By recording images on two separate rolls of film for the left and right eyes, and then projecting them simultaneously, the viewers can be tricked into seeing a 3D image on a 2D screen. The holographic type is known to be the most remarkable technology for displaying 3-D stereoscopic images. The holographic type can be further divided depending on the light source that is used. For example, there are holographic displays using laser and holographic displays using white light. The stereoscopic type uses psychological effects to create 3-D images. In normal vision, human eyes perceive views of the world from two different perspectives due to the spatial separation of two eyes. The spatial separation between typical eyes is about 65 mm. In order to assess the distance between objects, the brain integrates the two images obtained from each eye. By integrating two images, we are able to perceive 3-D images. The above method of perceiving a 3-D image is referred to as a stereography phenomenon. The stereoscopic type can be divided into a glasses type and a glasses-free type depending on whether glasses are adopted. The glasses-free type uses a parallax barrier, a lenticular lens array, or an integral lens array, etc. Among these, the lenticular lens array is widely under research today since observers can see 3-D images simply by disposing a lenticular lens on a display panel without any other equipment.

Figure 1:
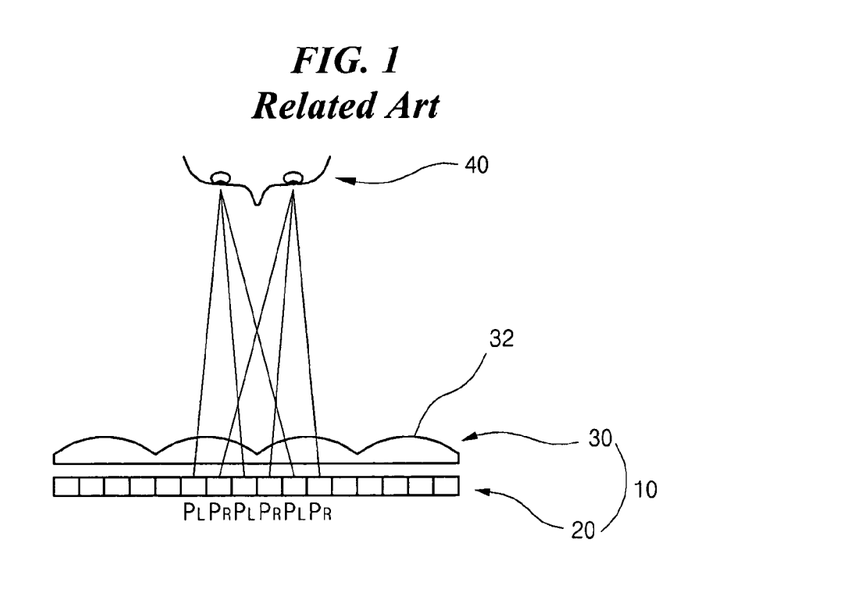
FIG. 1 is a schematic cross-sectional view of a lenticular lens array type image display device according to the related art.

FIG. 1 is a schematic cross-sectional view of a lenticular lens array type image display device according to the related art. As shown in FIG. 1, the lenticular lens array type image display device 10 includes a display panel 20 and a lenticular lens array 30. The display panel 20 displays the 2-D images for both left and right eyes. The lenticular lens array 30 assigns different viewing zones for the 2-D images according to the left and right eyes, respectively.

The display panel 20 is a flat panel display (FPD) device, examples of which include a cathode ray tube (CRT), a liquid crystal display (LCD) device, an organic light emitting display (OLED) device, a plasma display panel (PDP), and a field emission display (FED) device. First and second pixels PL and PR are alternately arranged on the display panel 20. The first pixel PL displays images for the left eye, and the second pixels PR displays images for the right eye. The lenticular lens array 30 includes a lenticular lens 32. The lenticular lens 32 has a half-cylinder shape and is regularly arranged.

The 2-D images emitted from the display panel 20 pass through the lenticular lens array 30 to reach the left and right eyes of an observer 40. The brain integrates the 2-D images obtained from each eye to perceive a 3-D image.

The lenticular lens array may include a liquid crystal layer. In this case, whether the liquid crystal layer functions as the lenticular lens is determined by the voltage that is supplied to the liquid crystal layer. When the liquid crystal layer functions as the lenticular lens, the image display device produces the 3-D images. When the liquid crystal layer does not function as the lenticular lens, the image display device produces the 2-D images. The switching between the two functions can be obtained because liquid crystal molecules in the liquid crystal layer have an ordinary refractive index and an extraordinary refractive index due to their an optical anisotropy and polarization properties. These optical properties can be changed when a voltage is applied to the liquid crystal molecules. In other words, it is possible to convert the 3-D display mode into a 2-D display mode by changing the applied voltage.

Figure 2A:
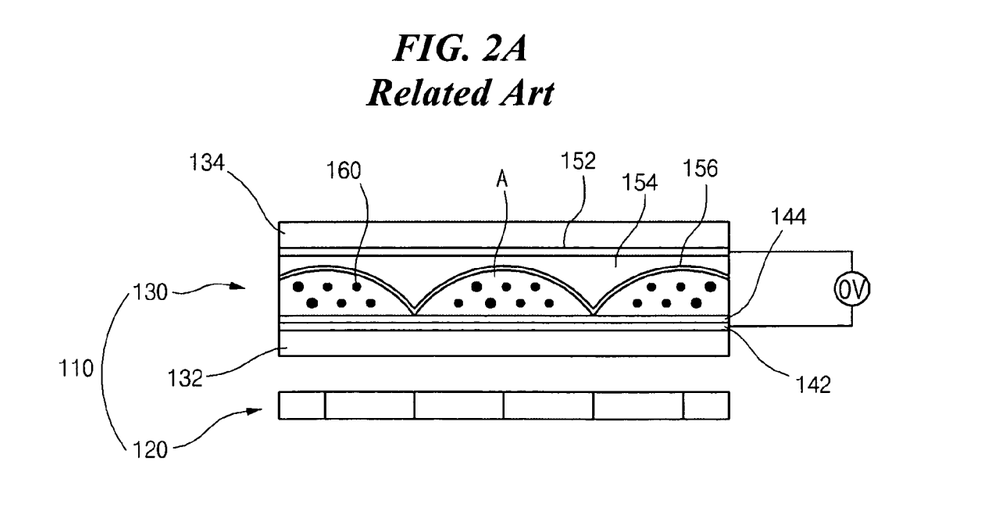
FIGS. 2A and 2B are cross-sectional views demonstrating a process of producing a 2-D mode and a 3-D mode, respectively, in a lenticular lens array type image display device according to the related art.
Figure 2B:
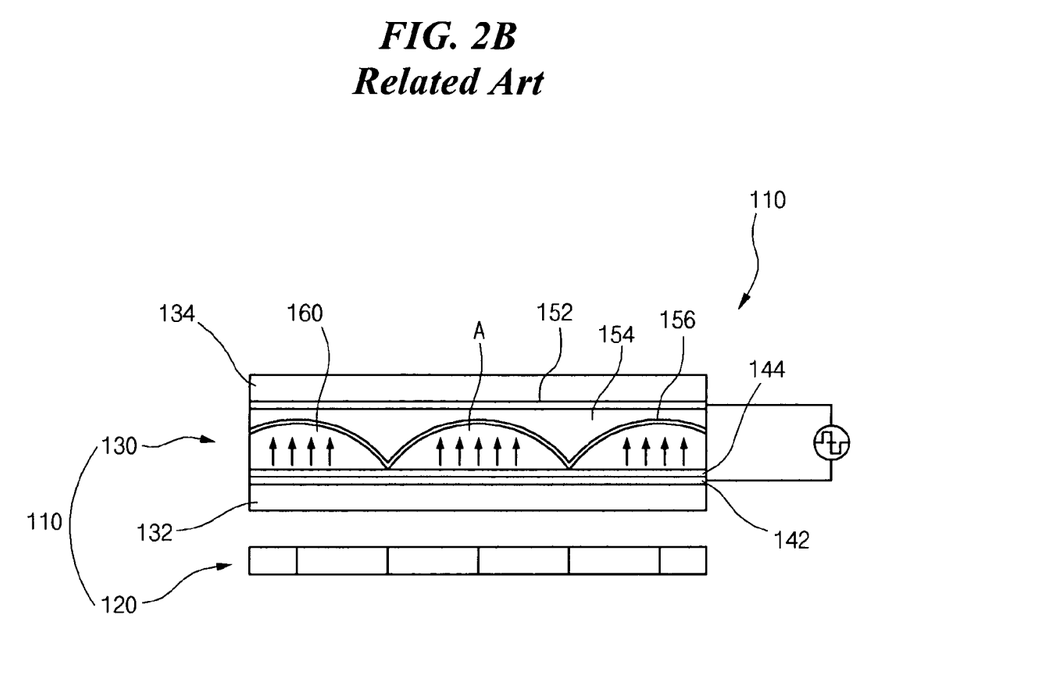

The lenticular lens array type image display device using the liquid crystal layer as the lenticular lens is further demonstrated in FIGS. 2A and 2B. FIGS. 2A and 2B are cross-sectional views that demonstrate the generation of a 2-D mode and a 3-D mode, respectively according to the related art. As shown in FIGS. 2A and 2B, a lenticular lens array type image display device 110 includes a display panel 120 and a lenticular lens array 130. When the lenticular lens array type image display device 110 is in the 2-D mode, the lenticular lens array 130 does not refract the 2-D images output from the display panel 120. Accordingly, the observer perceives a 2-D image. However, when the lenticular lens array type image display device 110 is in the 3-D mode, the lenticular lens array 130 refract the 2-D image from the display panel 120 such that the observer perceives a 3-D image.

The lenticular lens array 130 includes first and second substrates 132 and 134, first and second transparent electrodes 142 and 152, a transparent replica layer 154, first and second alignment layers 144 and 156, and a liquid crystal layer 160. The first and second substrates 132 and 134 face each other. The first and second transparent electrodes 142 and 152 are formed on inner sides of the first and second substrates 132 and 134, respectively. The transparent replica layer 154 is formed on the second transparent electrode 152. The transparent replica layer 154 has a plurality concave portion such that half-cylinder shaped cell spaces A are defined. The first and second alignment layers 144 and 156 are formed on the first transparent electrode 142 and the transparent replica layer 154, respectively. Accordingly, the second alignment layer 156 has a half-cylinder shape. The liquid crystal layer 160 functions as the lenticular lens and is formed between the first and second alignment layers 144 and 156. In other words, the liquid crystal layer 160 is formed in the cell space A. The replica layer 154 functions as a mold providing the half-cylinder shape, and not as an electrical means.

The liquid crystal layer 160 may include a nematic material. By controlling the electric field between the first and second transparent electrodes 142 and 152, the liquid crystal layer 160 can function either as a transparent layer in the 2-D mode and as a lenticular lens in the 3-D mode. In particular, as shown in FIG. 2A, when zero voltage is supplied between the first transparent electrode 142 and the second transparent electrode 152, the liquid crystal molecules have same orientations as the initial state. Accordingly, the liquid crystal layer 160 does not function as the lenticular lens. In this state, the image display device 110 is in the 2-D mode. However, as shown in FIG. 2B, when a voltage is supplied between the first and second transparent electrodes 142 and 152 to induce the electric field between the first and second transparent electrodes 142 and 152, the liquid crystal molecules rearrange. Accordingly, the liquid crystal molecules are aligned directionally, as shown in the arrows of FIG. 2B. In this state, the lenticular lens array type image display device 110 is in the 3-D mode.

Since the replica layer 154 and the liquid crystal layer 160 should be formed between the first and second transparent electrodes 142 and 152, a distance between the first and second transparent electrodes 142 and 152 is several tens of micrometers larger than that of a conventional LCD device. The density of the electric filed between the first and second transparent electrodes 142 and 152 is directly proportional to a voltage difference between the first and second transparent electrodes 142 and 152 and inversely proportional to a distance between the first and second transparent electrodes 142 and 152. Therefore, the lenticular lens array type image display device 110 requires a higher driving voltage when compared to the conventional LCD device, leading to increased power consumption.

SUMMARY OF THE INVENTION

Accordingly, the present invention is directed to a lenticular lens array and image display device including the same that substantially obviates one or more problems due to limitations and disadvantages of the related art.

An object of the present invention is to provide a lenticular lens array and an image display device using the same that easily converts a 2-D mode into a 3-D mode and a 3-D mode into a 2-D mode with low power consumption.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the lenticular lens array and image display device including the same includes a display panel, a first substrate over the display panel, a plurality of first electrodes on the first substrate, a plurality of second electrodes alternately arranged with the plurality of first electrodes, a second substrate facing the first substrate, a replica layer on the second substrate and having a concave pattern of half-cylinder shape, the concave pattern facing the second electrode, and a liquid crystal layer in the concave pattern.

In another aspect, an image display device includes a display panel, a first substrate over the display panel, a first electrode on the first substrate, an insulating layer on the first electrode, a plurality of second electrodes being formed on the insulating layer, the plurality of second electrodes being spaced apart from and parallel to each other, a second substrate facing the first substrate, a replica layer on the second substrate and having a concave pattern of half-cylinder shape, the concave pattern facing the plurality of second electrodes, and a liquid crystal layer in the concave pattern.

In yet another aspect, a lenticular lens array for an image display device includes first and second substrates facing each other, a plurality of first electrodes on the first substrate, a plurality of second electrodes alternately arranged with the plurality of first electrodes, a replica layer on the second substrate and having a concave pattern of half-cylinder shape, the concave pattern facing the second electrode, and a liquid crystal layer in the concave pattern.

In yet another aspect, a lenticular lens array for an image display device includes first and second substrates facing each other, a first electrode on the first substrate, an insulating layer on the first electrode, a plurality of second electrodes being formed on the insulating layer, the plurality of second electrodes being spaced apart from and parallel to each other, a replica layer on the second substrate and having a concave pattern of half-cylinder shape, the concave pattern facing the plurality of second electrodes, and a liquid crystal layer in the concave pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3A:
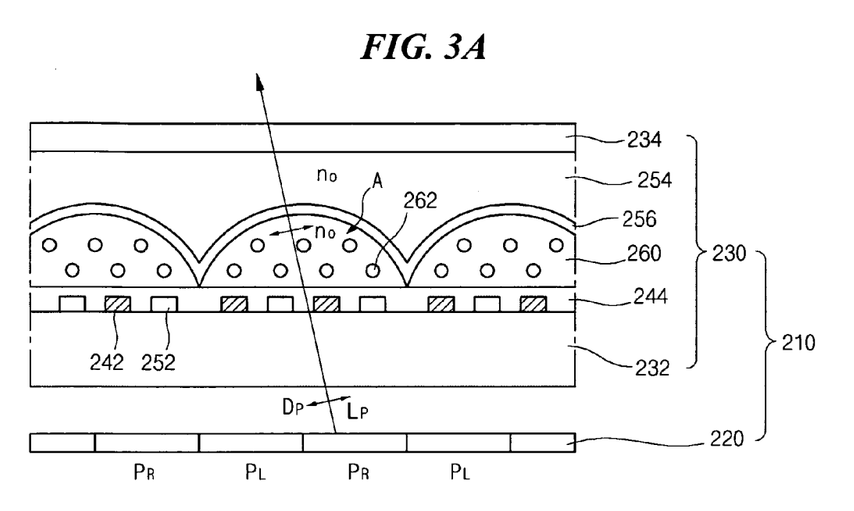
FIGS. 3A and 3B are cross-sectional views demonstrating a process of producing a 2-D mode and a 3-D mode, respectively, in a lenticular lens array type image display device according to an exemplary embodiment of the present invention.
Figure 3B:
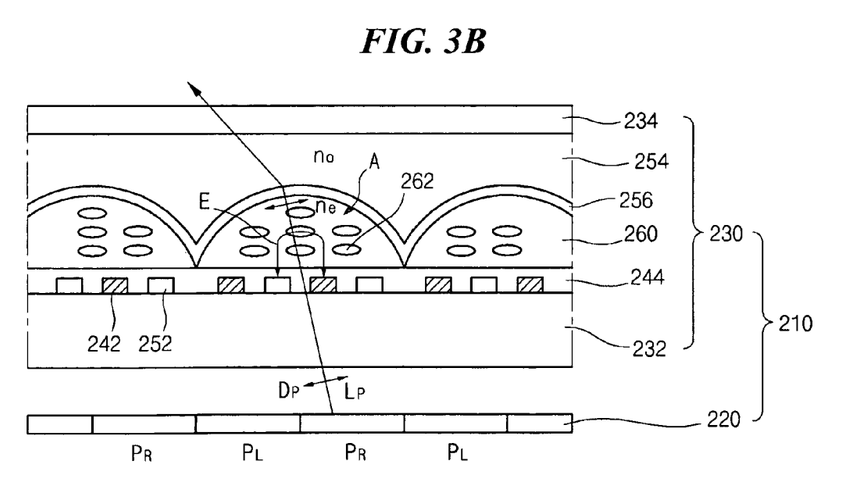
Figure 4:
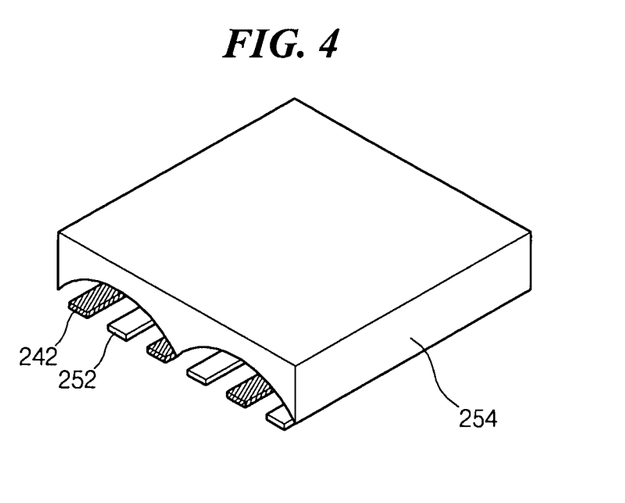
FIG. 4 is a perspective view of the exemplary lenticular lens array type image display device shown in FIGS. 3A and 3B.

FIGS. 3A and 3B are cross-sectional views demonstrating an exemplary process of producing a 2-D mode and a 3-D mode, respectively, in a lenticular lens array type image display device according to an embodiment of the present invention. FIG. 4 is a perspective view of the exemplary lenticular lens array type image display device shown in FIGS. 3A and 3B.

As shown in FIGS. 3A and 3B, the lenticular lens array type image display device 210 according to the present invention includes a display panel 220 and a lenticular lens array 230 over the display panel 220. The display panel 220 includes a first pixel PL and a second pixel PR. The first and second pixels PL and PR are alternately arranged and produce images for left and right eyes, respectively. The lenticular lens array 230 includes first and second substrates 232 and 234, a plurality of first electrodes 242, a plurality of second electrodes 252, a transparent replica layer 254, first and second alignment layers 244 and 256, and a liquid crystal layer 260. The first and second substrates 232 and 234 face each other, and other elements are formed therebetween. The first electrodes 242 and the second electrodes 252 are formed on an inner surface of the first substrate 232 facing the second substrate 234. The first alignment layer 244 is formed on the first electrodes 242 and the second electrodes 252. The first electrodes 242 are spaced apart from and parallel to each other. The second electrodes 252 are disposed between the first electrodes 242 such that the first electrodes 242 and the second electrodes 252 are parallel to each other and alternately arranged.

The transparent replica layer 254 is formed on an inner surface of the second substrate 234 such that the transparent replica layer 254 faces the first electrodes 242 and the second electrodes 252. The second alignment layer 256 is formed on the transparent layer 254. A surface of the transparent replica layer 254 has a concave half-cylinder shape. A longitudinal direction of the half-cylinder shape is parallel to the direction of the first electrodes 242 and the second electrodes 252. Since the second alignment layer 256 is formed along the half-cylinder shape, a space between the first and second alignment layers 244 and 256 is defined as a cell space A. The transparent replica layer 254 functions as a mold for the half-cylinder shape and not as an electrical means. In particular, the transparent replica layer 254 may include an insulating material.

The liquid crystal layer 260, which includes liquid crystal molecules, is formed between the first and second alignment layers 244 and 256. In other words, the liquid crystal layer 260 is formed in the cell space A. The first and second alignment layers 244 and 256 are aligned such that the major axis of the liquid crystal molecules in the initial state is parallel to inner sides of the first and second substrates 232 and 234. Accordingly, the liquid crystal layer 260 is formed along the longitudinal direction of the half-cylinder shape. It means that the liquid crystal layer 260 is parallel to the first electrodes 242 and the second electrodes 252. The liquid crystal layer 260 may include a nematic material or liquid crystal molecule having positive refractive index anisotropy.

A voltage is supplied between the first electrodes 242 and the second electrodes 252 such that the liquid crystal layer 260 is driven by an electric field induced between the first and second electrodes 242 and 252. Due to the refractive index anisotropy of liquid crystals, the liquid crystal layer 260 has different refractive indices for different directions. They are ordinary refractive index $n_o$ and extra-ordinary refractive index $n_e$. As an example, when light is incident upon the liquid crystal layer 260 in a principal direction, the refractive index of the liquid crystal layer 260 is $n_o$. When light is incident upon the liquid crystal layer 260 in a direction that is perpendicular to the principal direction, the refractive index of the liquid crystal layer 260 is $n_e$. However, when a voltage is applied to the liquid crystal layer to rotate the alignment of the liquid crystal molecules 262 in the liquid crystal layer 260, even when light is incident upon a liquid crystal layer 260 in the principal direction, the refractive index of the liquid crystal layer 260 is $n_e$.

The transparent replica layer 254 may have the same refractive index as one of the ordinary refractive index $n_o$ or the extra-ordinary refractive index $n_e$. In other words, while we will demonstrate, in FIGS. 3A and 3B, an exemplary embodiment, in which the liquid crystal layer 260 and the transparent replica layer 254 has a refractive index of $n_o$, when no voltage is applied between the first and second electrodes 242 and 252, the present invention is not limited to this exemplary embodiment. The scope of the invention includes another exemplary embodiment, in which the liquid crystal layer 260 and the transparent replica layer 254 have refractive indices of $n_e$, when no voltage is applied between the first and second electrodes 242 and 252.

Processes of producing the 2-D or 3-D images are explained referring to FIGS. 3A and 3B in more detail. In FIGS. 3A and 3B, the transparent replica layer 254 has the same refractive index as the ordinary refractive index $n_o$, and the ordinary refractive index $n_o$ is obtained along a cutting plane of FIGS. 3A and 3B. As shown in FIG. 3A, when a same voltage is applied into the first and second electrodes 242 and 252, the electric field is not induced between the first and second electrodes 242 and 252. Accordingly, the liquid crystal molecules 262 have the same orientation as the initial state. In this state, the liquid crystal layer 260 has an ordinary refractive index $n_o$, which is same as that of the transparent replica layer 254. Polarized incident light Lp from the display panel 220 pass through the liquid crystal layer 260 and the transparent replica layer 254 with a direction being parallel to the cutting plane. The polarized incident light Lp is perpendicular to a direction Dp of the polarizer (not shown).

Since the liquid crystal layer 260 and the transparent replica layer 254 have the same ordinary refractive index, the polarized incident light Lp is not refracted on an interface between the liquid crystal layer 260 and the transparent replica layer 254. In other words, the liquid crystal layer 260 does not function as the lenticular lens, and the lenticular lens array type image display device produces the 2-D images. In this case, all of the first and second pixel PL and PR display one 2-D image instead of respectively displaying images for the left and right eyes.

On the other hand, as shown in FIG. 3B, when different voltages are applied into the first and second electrodes 242 and 252, an electric field is induced between the first and second electrodes 242 and 252 to control the alignment direction of the liquid crystal molecules 262. Since both of the first and second electrodes 242 and 252 are formed on the first substrate 232, the electric field between the first and second electrodes 242 and 252 has a horizontal profile. This horizontal electric field changes the alignment direction of the liquid crystal molecules 262 from the initial state. Accordingly, the liquid crystal layer 260 has the extra-ordinary refractive index $n_e$, which is different from the transparent replica layer 254. Therefore, polarized incident light Lp from the display panel 220 passes through the liquid crystal layer 260 and the transparent replica layer 254 as shown in the arrow of FIG. 3B. Since the liquid crystal layer 260 and the transparent replica layer 254 have the ordinary refractive index $n_o$ and the extra-ordinary refractive index $n_e$, respectively, the polarized incident light Lp is refracted on the interface of the liquid crystal layer 260 and the transparent replica layer 254. In this state, the liquid crystal layer 260 functions as the lenticular lens. Accordingly, the lenticular lens array type image display device produces a 3-D image in this state. As mentioned above, since the liquid crystal layer 260 functions as either a transparent layer or lenticular lens depending on the applied electric field, the lenticular lens array type image display device according to the present invention can selectively switch between the 2-D and 3-D modes.

FIG. 4 is a perspective view of the exemplary lenticular lens array type image display device shown in FIGS. 3A and 3B. Unlike conventional devices, the distance between the first and second substrates 242 and 252 is only about several micrometers. This is possible because the first and second substrates 242 and 252 are formed on the same substrate, i.e., the first substrate. Accordingly, the liquid crystal layer 260 is driven by low power consumption.

In another exemplary embodiment, the transparent replica layer 254 may have the same refractive index as the extra-ordinary refractive index $n_e$. In this case, when a same voltage is applied into the first and second electrodes 242 and 252, the liquid crystal layer 260 functions as the lenticular lens such that the image display device displays a 3-D image. On the other hand, when different voltages are applied into the first and second electrodes 242 and 252, the liquid crystal layer 260 functions as the transparent layer such that the image display device displays a 2-D image.

In yet another exemplary embodiment, the polarized incident light from the display panel 220 may be perpendicular to the cutting line. Assuming that the transparent replica layer 254 has the same refractive index as the ordinary refractive index $n_o$. In this case, when a same voltage is applied into the first and second electrodes 242 and 252, the liquid crystal layer 260 functions as the lenticular lens such that the image display device displays a 3-D image. On the other hand, when different voltages are applied into the first and second electrodes 242 and 252, the liquid crystal layer 260 functions as the transparent layer such that the image display device displays a 2-D image.

In yet another exemplary embodiment, the first and second electrodes 242 and 252 may be formed on different layers. For example, the second electrode 252 is formed on an insulating layer (not shown) on the first electrode 242.

The liquid crystal layer 260 may have the ordinary refractive index $n_o$ between about 1.5 and about 1.6 and the extraordinary refractive index $n_e$ between about 1.7 and about 2.0. As a gap between the ordinary refractive index $n_o$ and the extra-ordinary refractive index $n_e$, i.e., the refractive index anisotropy, increases, the liquid crystal layer 260 becomes more effective in functioning as the lenticular lens with the smaller size of the half-cylinder shape. Accordingly, as the gap between the ordinary refractive index $n_o$ and the extra-ordinary refractive index $n_e$ increases, the thickness of the liquid crystal layer 260 can become thinner.

Figure 5:
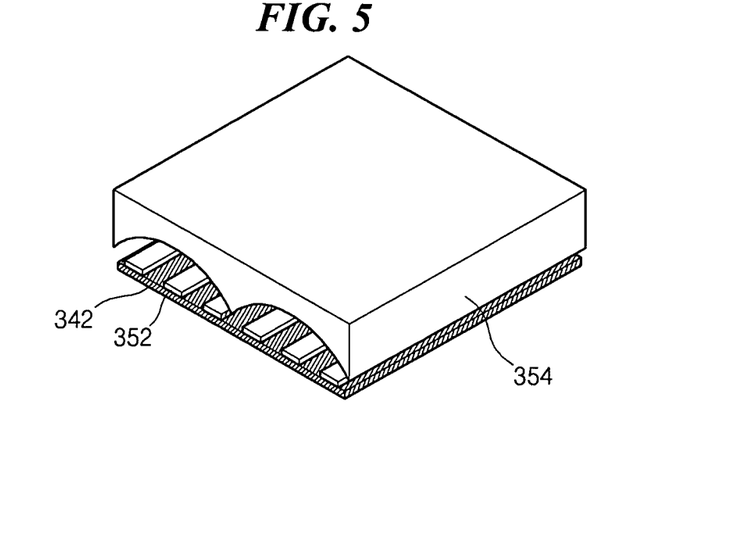
FIG. 5 is a perspective view of a lenticular lens array type image display device according to another exemplary embodiment of the present invention.

FIG. 5 is a perspective view of a lenticular lens array type image display device according to another exemplary embodiment of the present invention. Hereinafter, a difference between the first exemplary embodiment described by FIGS. 3A, 3B and 4 and this embodiment is explained. The difference is in the first and second electrodes.

The first electrode 342 is formed on an entire surface of the first substrate (not shown). The plurality of second electrodes 352 are formed on the first substrate 342. The plurality of second electrodes 352 are spaced apart from and parallel to each other. An insulating layer (not shown) is interposed between the first and second electrodes 342 and 352. The transparent replica layer 354 is formed on the second substrate (not shown) and has the concave of the half-cylinder shape. The major axis of the half-cylinder shape is formed along the second electrode 352. Though not shown, the first and second alignment layers are formed on the second electrode 352 and the transparent replica layer 354, respectively. Also, the liquid crystal layer is formed on the first and second alignment layers, and the display panel is formed under the first substrate.

When different voltages are applied into the first and second electrodes 342 and 352, the electric field induced between the first and second electrodes 342 and 352 drives the liquid crystal layer. Other elements and driving principles are same as the exemplary embodiment described by FIGS. 3A, 3B, and 4.

FPD devices including the LCD device, the FED device, the PDP, the OLED device are used for the display panel. In the present invention, a polarized light should be input into the lenticular lens array. Accordingly, when an LCD device is used for the display panel, there is no need for an additional element, such as a polarizer, since the light output from a LCD device is already polarized. However, when using another device as a display panel, there is a need to externally add polarizer.

It will be apparent to those skilled in the art that various modifications and variations can be made in the lenticular lens array and image display device including the same of the present invention without departing from the spirit or scope of the invention. Thus, it is intended that the present invention cover the modifications and variations of this invention provided they come within the scope of the appended claims and their equivalents.

What is claimed is:

1. An image display device, comprising:
   a display panel
   a first substrate over the display panel;
   a plurality of first electrodes on the first substrate;
   a plurality of second electrodes alternately arranged with the plurality of first electrodes;
   a first alignment layer on the first and second electrodes;
   a second substrate facing the first substrate;
   a replica layer on the second substrate and having a concave pattern of half-cylinder shapes, the concave pattern facing the second electrode;
   a second alignment layer on the concave pattern, the second alignment layer corresponding to ends of the concave pattern contacts the first alignment layer to form a closed space; and
   a liquid crystal layer in the closed space and comprising liquid crystal molecules,
   wherein:
      a 3D image is displayed when different voltages are respectively applied into the first and second electrodes, and
      a 2D image is displayed when the same voltage is applied into the first and second electrodes,
   wherein the liquid crystal layer includes liquid crystal molecules having positive refractive index anisotropy such that the replica layer has a refractive index being substantially same as an ordinary refractive index of the liquid crystal molecules
   wherein each of the plurality of first electrodes and the plurality of second electrodes has a bar shape, and a major axis of the bar shape is parallel to a major axis of the half-cylinder shape of the concave pattern, and
   wherein the liquid crystal molecules are aligned such that a major axis of the liquid crystal molecules is parallel to the first and second substrates and the major axis of the first electrodes, the second electrodes, and the half-cylinder shape in an OFF state.

2. The device according to claim 1, further comprising:
the first alignment layer formed between the plurality of second electrodes and the liquid crystal layer; and
the second alignment layer formed between the replica layer and the liquid crystal layer.

3. The device according to claim 1, further comprising an insulating layer on the plurality of first electrodes, wherein the plurality of second electrodes are formed on the insulating layer.

4. The device according to claim 1, wherein liquid crystal molecules in the liquid crystal layer are horizontally rotated by a horizontal electric field induced between each of the plurality of first electrodes and each of the plurality of second electrodes.

5. The device according to claim 1, wherein the liquid crystal layer has an ordinary refractive index and an extra-ordinary refractive index according to alignment directions of liquid crystal molecules in the liquid crystal layer.

6. The device according to claim 5, wherein the replica layer has one of a refractive index corresponding to the ordinary refractive index of the liquid crystal layer and a refractive index corresponding to the extra-ordinary refractive index of the liquid crystal layer.

7. The device according to claim 5, wherein the ordinary refractive index is between about 1.50 and about 1.60, and the extra-ordinary refractive index is between about 1.70 and about 2.00.

8. The device according to claim 1, wherein the display panel supplies a polarized light to the first substrate.

9. The device according to claim 1, wherein the display panel includes one of a liquid crystal display device, a field emission display device, a plasma display panel, and an electroluminescent display device, which have at least one polarizer.

10. The device according to claim 1, wherein one half-cylinder shape covers an electrode group including at least two first electrodes and at least one second electrodes or at least one first electrode and at least two second electrodes.

11. An image display device, comprising:
a display panel
a first substrate over the display panel;
a first electrode on the first substrate;
an insulating layer on the first electrode;
a plurality of second electrodes formed on the insulating layer, the plurality of second electrodes in one pixel being spaced apart from and parallel to each other;
a first alignment layer on the first and second electrodes;
a second substrate facing the first substrate;
a replica layer on the second substrate and having a concave pattern of half-cylinder shapes, the concave pattern facing the plurality of second electrodes;
a second alignment layer on the concave pattern, the second alignment layer corresponding to ends of the concave pattern contacts the first alignment layer to form a closed space; and
a liquid crystal layer in the closed space and comprising liquid crystal molecules,
wherein:
a 3D image is displayed when different voltages are respectively applied into the first and second electrodes, and
a 2D image is displayed when the same voltage is applied into the first and second electrodes,
wherein the liquid crystal layer includes liquid crystal molecules having positive refractive index anisotropy such that the replica layer has a refractive index being substantially same as an ordinary refractive index of the liquid crystal molecules
wherein each of the plurality of second electrodes has a bar shape, and a major axis of the bar shape is parallel to a major axis of the half-cylinder shape of the concave pattern, and
wherein the liquid crystal molecules are aligned such that a major axis of the liquid crystal molecules is parallel to the first and second substrates and the major axis of the second electrodes and the half-cylinder shape in an OFF state.

12. The device according to claim 11, further comprising:
the first alignment layer formed between the plurality of second electrodes and the liquid crystal layer; and
the second alignment layer formed between the replica layer and the liquid crystal layer.

13. The device according to claim 11, wherein liquid crystal molecules in the liquid crystal layer are horizontally rotated by a horizontal electric field induced between each of the plurality of first electrodes and each of the plurality of second electrodes.

14. The device according to claim 11, wherein the liquid crystal layer has an ordinary refractive index and an extra-ordinary refractive index according to alignment directions of liquid crystal molecules in the liquid crystal layer.

15. The device according to claim 14, wherein the replica layer has one of a refractive index corresponding to the ordinary refractive index of the liquid crystal layer and a refractive index corresponding to the extra-ordinary refractive index of the liquid crystal layer.

16. The device according to claim 14, wherein the ordinary refractive index is between about 1.50 and about 1.60, and the extra-ordinary refractive index is between about 1.70 and about 2.00.

17. The device according to claim 11, wherein the display panel supplies a polarized light to the first substrate.

18. The device according to claim 11, wherein the display panel includes one of a liquid crystal display device, a field emission display device, a plasma display panel, and an electroluminescent display device, which have at least one polarizer.

19. The device according to claim 11, wherein the first electrode is formed on an entire surface of the first substrate.

20. The device according to claim 11, wherein one half-cylinder shape covers an electrode group including at least three second electrodes.

* * * * *